United States Patent [19]
Falgén et al.

[11] Patent Number: 5,478,446
[45] Date of Patent: Dec. 26, 1995

[54] ELECTROCHEMICAL PROCESS

[75] Inventors: Helena Falgén; Göran Sundström; Johan Landfors, all of Sundsvall, Sweden

[73] Assignee: Eka Nobel Inc., Marietta, Ga.

[21] Appl. No.: 269,098

[22] Filed: Jun. 30, 1994

Related U.S. Application Data

[63] Continuation-in-part of Ser. No. 120,814, Sep. 15, 1993.

[30] Foreign Application Priority Data

Jul. 2, 1993 [SE] Sweden ................... 9302279

[51] Int. Cl.$^6$ .............. C25B 1/26; B01D 61/44
[52] U.S. Cl. .............. 204/95; 204/96; 204/101; 204/103; 204/104
[58] Field of Search ............... 204/95, 96, 101, 204/103, 104; 423/477, 478, 480

[56] References Cited

U.S. PATENT DOCUMENTS

| | | | |
|---|---|---|---|
| 2,332,181 | 10/1943 | Soule | 23/152 |
| 2,833,624 | 5/1958 | Sprauer | 23/152 |
| 3,341,288 | 9/1967 | Partridge et al. | 23/152 |
| 3,563,702 | 2/1971 | Partridge et al. | 23/121 |
| 3,760,065 | 9/1973 | Rapson | 423/478 |
| 3,810,969 | 5/1974 | Schlumberger | 423/478 |
| 4,081,520 | 3/1978 | Swindells et al. | 423/478 |
| 4,129,484 | 12/1978 | Larsson | 204/101 |
| 4,325,934 | 4/1982 | Swindells et al. | 423/478 |
| 4,465,658 | 8/1984 | Fredette | 423/478 |
| 4,683,039 | 7/1987 | Twardowski et al. | 204/95 |
| 4,798,715 | 1/1989 | Hardee et al. | 423/478 |
| 4,808,215 | 2/1989 | Twardowski | 204/98 |
| 4,915,927 | 4/1990 | Lipsztajn et al. | 423/472 |
| 5,084,148 | 1/1982 | Kazcur et al. | 204/95 |
| 5,091,166 | 2/1992 | Engstrom et al. | 423/478 |
| 5,091,167 | 2/1992 | Engstrom et al. | 423/428 |

(List continued on next page.)

FOREIGN PATENT DOCUMENTS

| | | |
|---|---|---|
| 0532188 | 3/1993 | European Pat. Off. |
| 3115102 | 5/1991 | Japan. |
| WO9010733 | 9/1990 | WIPO. |
| WO9112356 | 8/1991 | WIPO. |

(List continued on next page.)

OTHER PUBLICATIONS

Jorissen et al, "The Behaviour of Ion Exchange Membranes in Electrolysis and Electrolysis and Electrodialysis of Sodium Sulfate", Journal of Applied Electrochemistry, vol. 21, 1991, pp. 869–870. No Month.

Abstract EPO, WPI, Section Ch. Week 9126, Derwent Publications, London, GB, Class E36, AN 91–188766 JP3–115102A May 1991.

Primary Examiner—John Niebling
Assistant Examiner—Arun S. Phasge
Attorney, Agent, or Firm—Leydig, Voit & Mayer

[57] ABSTRACT

The invention relates to a method of producing an acidified aqueous solution containing alkali metal sulfate and chlorate comprising the steps of introducing an aqueous solution containing alkali metal sulfate and chlorate into an electrochemical cell and electrochemically increasing the acidity of said aqueous solution, wherein the current efficiency of the cell is maintained below 70%. The invention also relates to a method of producing chlorine dioxide comprising the steps: Providing a reactor with an aqueous acidic reaction medium containing alkali metal chlorate and sulfate; reducing chlorate ions in said reaction medium to form chlorine dioxide; withdrawing chlorine dioxide gas from the reaction medium; withdrawing reaction medium from the reactor and transferring it to an electrochemical cell substantially without crystallization of sulfate or chlorate; electrochemically acidifying said reaction medium to increase the acidity and to decrease the content of alkali metal ions; recycling acidified reaction medium to the reactor; adding make up alkali metal chlorate to the reaction medium before or after the electrochemical cell; wherein the current efficiency of the electrochemical cell is maintained below about 80%.

22 Claims, 2 Drawing Sheets

U.S. PATENT DOCUMENTS

| | | | |
|---|---|---|---|
| 5,106,465 | 4/1992 | Kaczur et al. | 204/98 |
| 5,108,560 | 4/1992 | Cawlfield et al. | 204/103 |
| 5,116,595 | 5/1992 | Scribner et al. | 423/477 |
| 5,122,240 | 6/1992 | Cowley et al. | 204/101 |
| 5,174,868 | 12/1992 | Lipsztajn et al. | 204/95 |
| 5,198,080 | 3/1993 | Cowley et al. | 204/101 |
| 5,230,779 | 7/1993 | Martin | 204/98 |

FOREIGN PATENT DOCUMENTS

| | | |
|---|---|---|
| WO9203374 | 3/1992 | WIPO. |
| WO9304979 | 3/1993 | WIPO. |
| WO93/19227 | 9/1993 | WIPO. |
| WO93/25470 | 12/1993 | WIPO. |

ELECTROCHEMICAL PROCESS

This application is a continuation-in-part of application Ser. No. 08/120,814, filed Sep. 15, 1993.

BACKGROUND OF THE INVENTION

The present invention relates to electrochemical acidification of aqueous solutions containing alkali metal sulfate and chlorate. The inventions also relates to production of chlorine dioxide comprising electrochemical acidification of effluents and recirculation of the acidified effluents to the chlorine dioxide reactor.

Electrochemical acidification of aqueous solutions containing sulfate and/or chlorate is of considerable interest, particularly in connection with recovery of by-products from process of producing chlorine dioxide.

Chlorine dioxide used in aqueous solution is of considerable commercial interest, mainly in pulp bleaching, but also in water purification, fan bleaching, removal of phenols from industrial wastes etc. It is therefore desirable to provide processes in which chlorine dioxide can be efficiently produced.

There are numerous different processes for chlorine dioxide production. Most processes in commercial use involve reaction of sodium chlorate in an acidic medium with a reducing agent such as hydrogen peroxide, methanol, chloride ions or sulfur dioxide. The acidity is generally provided by sulfuric acid. A drawback of the known processes is the formation of some form of sodium sulfate as a by-product which has to be removed from the reactor, either in the form of a solid saltcake or as waste acid. Most modern processes are operated under subatmospheric pressure, involving precipitation of the sodium sulfate as a saltcake which has to be removed from the reactor by filtering. Today it is hard to find any use for the salt cake and it is normally regarded as an unwanted by-product.

In order to avoid formation of a sulfate by-product, it has been disclosed to provide all acid needed for the chlorine dioxide generation from chloric acid which can be prepared electrochemically from sodium chlorate. Such methods are described in, for example, the U.S. Pat. Nos. 4,915,927, 5,084,148 and 5,174,868. However, it has been found difficult to achieve satisfactory current efficiency in production of strong chloric acid which is desirable in order provide efficient chlorine dioxide generation.

International patent specification WO 93/25470 discloses a process of producing chlorine dioxide from chloric acid and hydrogen peroxide. The chloric acid can be produced electrochemically.

U.S. Pat. No. 4,806,215 discloses a process in which chlorine dioxide is generated from sodium chlorate and hydrochloric acid, in which process the generator liquor is acidified electrochemically and recycled back to the reactor. However, this process necessarily results in co-formation of chlorine which cannot be accepted in modern environmental friendly bleaching processes.

U.S. Pat. No. 4,129,484 discloses a process of producing chlorine dioxide in which process sulfuric acid and sodium hydrogen sulfate is withdrawn from the reactor and subjected to electrolysis. However, the current efficiency obtained in the electrochemical cell is not satisfactory.

U.S. Pat. Nos. 5,198,080 and 5,122,140 disclose a process of producing chlorine dioxide involving crystallisation and withdrawal of solid sodium sesquisulfate. The solid salt is dissolved again, electrolytically acidified and recycled to the chlorine dioxide reactor. High current efficiency is said to be achieved if sodium chlorate is added to the dissolved sulfate before the electrochemical cell.

International patent specification WO 93/19227 discloses that electrochemical acidification of alkali metal sulfate solutions preferably is performed at a water content below about 55% by weight.

It is an object of the invention to provide an electrochemical process for acidification of an aqueous solution containing sulfate and chlorate which can be operated efficiently for a long time. It is another object of the invention to provide an efficient process of producing chlorine dioxide involving electrochemical acidification of by-products obtained.

BRIEF DESCRIPTION OF THE DRAWINGS

For a full understanding of the invention, the following detailed description should be read in conjunction with the drawings wherein.

DETAILED DESCRIPTION OF PREFERRED EMBODIMENTS

Figure 1:
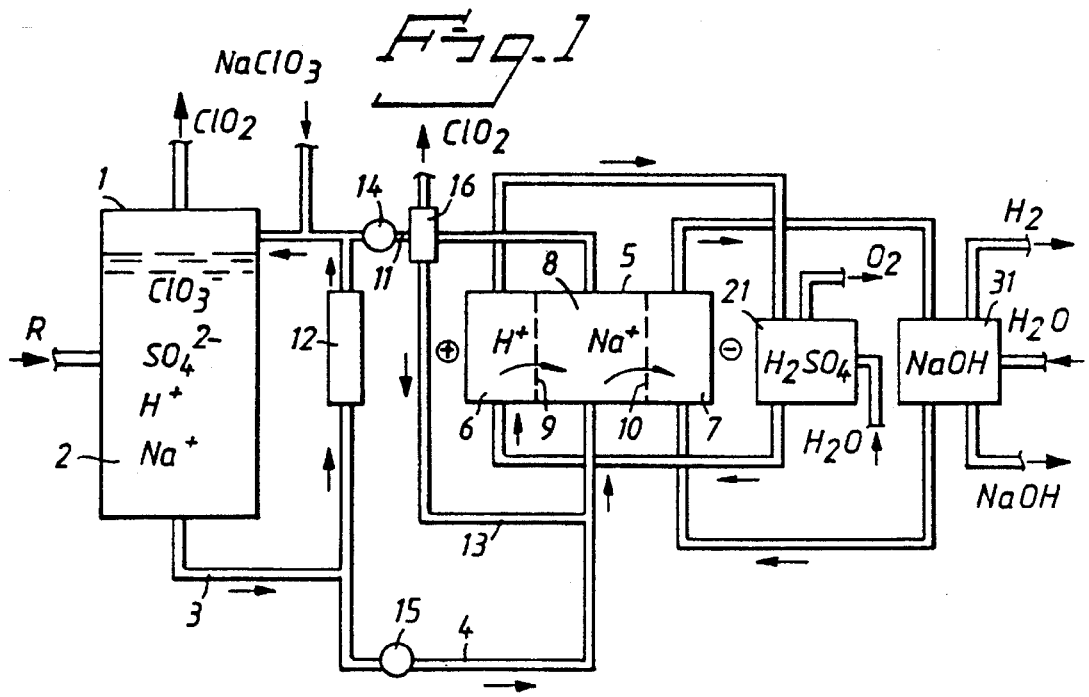
FIG. 1 is a schematic of one embodiment of the present invention using a three chamber electrochemical cell.

The prior art relating to electrochemical acidification of sulfate- and chlorate solutions generally aims at providing processes with maximum current efficiency and it is said robe possible to obtain a current efficiency of 85% or more. It certainly is desirable to operate at a high current efficiency, but it has now surprisingly been found that it is advantageous to operate at a current efficiency below the maximum efficiency obtainable. The current efficiency obtainable is dependent on the concentration of the solutions to be acidified. Thus, the maximum current efficiency is obtained if the solution to be acidified is almost saturated. However, it has been found that if an electrochemical cell is operated for a long time with maximum current efficiency, the cell voltage starts rising which increases the energy consumption to an unacceptable level.

The current efficiency is also dependent on the acidity and the sulfate content in the cell. In processes of producing chlorine dioxide comprising electrochemical acidification of effluents containing sulfate and/or chlorate and recirculation of the acidified effluents, it has been found that the production of chlorine dioxide is decreased if the electrochemical cell is operated at maximum current efficiency.

According to one aspect, the invention relates to a method of producing an acidified solution of alkali metal sulfate and chlorate, The method comprises the steps of introducing an aqueous solution containing alkali metal sulfate and alkali metal chlorate into an electrochemical cell and electrochemically increasing the acidity of said aqueous solution. The current efficiency of the cell is maintained below 70%, preferably below about 65%. The acidified solution is preferably used in a process of producing chlorine dioxide by reducing chlorate. It is favourable to treat effluents from a chlorine dioxide reactor in the electrochemical cell. The effluent may either be depleted reaction medium or dissolved salt cake comprising alkali metal sulfate, optionally with added alkali metal chlorate.

According to another aspect, the invention relates to a method of producing chlorine dioxide comprising the steps: Providing a reactor with an aqueous acidic reaction medium containing alkali metal chlorate and sulfate; reducing chlorate ions in said reaction medium to form chlorine dioxide; withdrawing chlorine dioxide gas from the reaction medium; withdrawing reaction medium from the reactor and transferring it to an electrochemical cell substantially without crystallization of sulfate or chlorate; electrochemically acidifying said reaction medium to increase the acidity and to decrease the content of alkali metal ions; recycling acidified reaction medium to the reactor; adding make up alkali metal chlorate to the reaction medium before or after the electrochemical cell; wherein the current efficiency of the electrochemical cell is maintained below about 80%, preferably below about 75%, most preferably below about 70%.

According to another aspect, the invention relates to a method of producing chlorine dioxide comprising the steps: providing a reactor with an aqueous acidic reaction medium containing alkali metal chlorate and sulfate; reducing chlorate ions in said reaction medium to form chlorine dioxide; withdrawing chlorine dioxide gas from the reaction medium; withdrawing reaction medium from the reactor and transferring it to an electrochemical cell; electrochemically acidifying said reaction medium to increase the acidity and to decrease the content of alkali metal ions; recycling acidified reaction medium to the reactor; adding make up alkali metal chlorate to the reaction medium before or after the electrochemical cell; wherein the current efficiency of the electrochemical cell is maintained below 70%.

According to another aspect, the invention related to a method of producing chlorine dioxide comprising the steps: Providing a reactor with an aqueous acidic reaction medium containing alkali metal chlorate; reducing chlorate ions in said reaction medium to form chlorine dioxide using hydrogen peroxide as a reducing agent; withdrawing chlorine dioxide gas from the reaction medium; withdrawing reaction medium from the reactor and transferring it to an electrochemical cell; electrochemically acidifying said reaction medium to increase the acidity and to decrease the content of alkali metal ions; recycling acidified reaction medium to the reactor; adding make up alkali metal chlorate to the reaction medium before or after the electrochemical cell; wherein the current efficiency of the electrochemical cell is maintained below about 80%, preferably below about 75%, most preferably below about 70%.

The current efficiency in the present disclosure relates to the withdrawal of alkali metal ions from the solution to be acidified in the electrochemical cell, which in the case of chlorine dioxide production is equivalent to the reaction medium withdrawn from the chlorine dioxide reactor. If alkali metal hydroxide is produced in the electrochemical cell, the current efficiency for withdrawal of alkali metal ions from the solution to be acidified is equivalent to the current efficiency for alkali metal hydroxide production.

The alkali metal referred to in the present description could be any alkali metal such as sodium or potassium. Normally, sodium is preferred.

In all aspects of the invention it is preferred if the current efficiency is maintained above about 40%, most preferably above about 50%. Any suitable electrochemical cell enabling acidification of the reaction medium can be used, for example combined electrolyses/electrodialysis cells or electrodialysis cells arranged in snacks. Normally, a cell comprising an anode compartment and a cathode compartment divided by at least one ion selective membrane is best suitable. In addition to an anode- and a cathode compartment, such a cell may comprise one or several compartments in the middle. It is also possible to use bi-polar membranes, particularly in electrodialysis stacks. Any standard type of electrodes can be used. For instance, the anode can be DSA $O_2$™ and the cathode can be Ni. Also gas electrodes such as Hydrina™ can be used. Further, standard polymeric ion-exchange membranes can be used, but also high ion conducting membranes such as ceramic membranes can be useful.

In one preferred embodiment, the aqueous solution to be acidified is supplied to the middle compartment of a three chamber cell comprising two cation-exchange membranes. Preferably, water or an aqueous solution containing sulfuric acid is supplied to the anode compartment and water or an aqueous solution containing alkali metal hydroxide is supplied to the cathode compartment. In such a cell, hydrogen ions are generated in the anode compartment and passed through the membrane into the middle compartment replacing alkali metal ions passed into the cathode compartment. In the anode compartment oxygen gas is produced, while hydrogen gas and hydroxide ions are produced in the cathode compartment. The advantage of this embodiment is that substances that may be present in the aqueous solution, such as chlorate, chloride ions and methanol, are not so easily oxidised on the anode, thus avoiding formation of perchlorate, chlorine and formic acid. Further, the life-time of the anode is increased.

It is also possible to perform the electrolysis in electrochemical cells known per so, for example from the already mentioned U.S. Pat. No. 4,229,487. Thus, it is possible to use a three chamber cell in which the middle compartment is defined by an anion exchange membrane and a cation exchange membrane, entering the aqueous solution into the middle compartment, passing chlorate ions and sulfate ions through an anion-exchange membrane into the anode compartment, and withdrawing acidified solution there from. Further, a two chamber cell divided by an cation-exchange membrane could be used, acidifying the aqueous solution in the anode compartment and passing alkali metal ions through the cation-exchange membrane into the cathode compartment. In these cases, it is also possible to produce alkali metal hydroxide, hydrogen gas and oxygen gas as valuable by-products. It is also possible to use a two chamber cell divided by a anion-exchange membrane. The main advantage of using a two chamber cell is that the investment costs are lower.

Suitably the aqueous solution introduced to the electrochemical cell contains sulfate, preferably more than about 3 moles/liter, most preferably more than about 4 moles/liter. It is also preferred that the aqueous solution is acid and the $H^+$ concentration is suitably from about 1.5 to about 11 moles/liter, preferably from about 3 to about 9 moles/liter, most preferably from about 3 to about 7 moles/liter, particularly most preferably from about 3 to about 5 moles/liter. High sulfate content has been found to increase the current efficiency. The upper limit of the sulfate concentration is determined by the concentration at saturation which is dependent on several parameters, particularly the acidity. For instance, if an aqueous solution of sodium sulfate and sodium chlorate at about 60° C. contains about 4 moles/liter of $H^+$, and about 3.8–4.6 moles/liter of sulfate, sodium sulfate or sodium chlorate starts crystallising at about 3–5 moles/liter of chlorate, and if a solution contains about 6.5 moles/liter of $H^+$ and about 5.8–6.6 moles/liter of sulfate, sodium sulfate or sodium chlorate starts crystallising at about 2.8–4.3 moles/liter of chlorate. The saturation concentration increases slightly with the temperature. It is preferred to operate at a chlorate concentration from about 20% to about 90% of the saturation concentration, most preferably from about 40 to about 90% of the saturation concentration. Maintaining the chlorate concentration too close to saturation may cause problem with cell voltage increase after some time of operation.

High acidity has been found to increase the amount of sulfate that is soluble. Further, if the acidified solution is supplied to a chlorine dioxide reactor, the chlorine dioxide production has been found to increase with the acidity while high sulfate content has been found to be unfavourable to the chlorine dioxide production. Accordingly, if the current efficiency of the cell is increased, the chlorine dioxide production is automatically decreased and vice versa. In order to achieve both high chlorine dioxide production and current efficiency it has been found suitable if the molar ratio $H^+:SO_4^{2-}$ is from about 0.5 to about 1.5, preferably from 0.7 to 1.3, most preferably from 0.9 to 1.2. Preferably the chlorine dioxide production is maintained above about 1 tonne per $m^3$ reaction medium and 24 hours.

In the embodiments relating to chlorine dioxide production the aqueous solution to be electrochemically acidified refers to the reaction medium withdrawn from the chlorine dioxide reactor.

In all the embodiments relating to production of chlorine dioxide, the chlorate ions can be reduced by a reducing agent which is most preferred, but also electrochemical reduction is possible. Suitably, a reducing agent is added to the reaction medium, which reducing agent can be selected from organic substances such as methanol, ethanol, isopropanol, other alcohols or formaldehyde, or from inorganic substances such a hydrogen peroxide or chloride ions. Also mixtures of different reducing agents can be used. Hydrogen peroxide and methanol are the most preferred reducing agents since they offer the possibility of efficiently producing chlorine dioxide substantially without formation of chlorine. Hydrogen peroxide is particularly preferred since high production rate can be achieved at low acidities, for example from about 2 to about 5N, and no by products that may damage the electrochemical cell are produced. Particularly, it is possible to combine a comparatively high current efficiency, for example from about 60 to about 70%, with a high production rate of chlorine dioxide, for example from about 1 to about 2 tonnes $ClO_2$ per $m^3$ and 24 hours. In the case methanol is used as a reducing agent, the current efficiency is preferably maintained below about 65%, most preferably below about 60%.

Generally, the reaction medium leaving the chlorine dioxide reactor has substantially the same composition as it has within the reactor. The reactor for generation of chlorine dioxide can be of any known type, such as SVP®, Mathieson and others. However, it is preferred to operate the reactor without crystallisation.

The chlorine dioxide producing reactions are favoured by the addition of small amounts of catalysts to the reactor. Preferred catalysts belong to the groups VB-VIII, IB, IVA and VIIA of the Periodic Table of the elements. High activity can be achieved by compounds containing V, Nb, Cr, Mn, Fe, Ru, Os, Ni, Pd, Pt, Cu, Ag, Ge, St, Pb, Br, and I, either separate or in combinations.

Although not necessary, it is possible to add small amounts of chloride ions, preferably in the form of alkali metal chloride, so as to maintain the concentration thereof in the reaction medium within the range from about 0.001 up to about 0.8 moles/liter.

Although chlorine dioxide generation under atmospheric pressure is possible, it is advantageous if the reaction medium is maintained under subatmospheric pressure in the reactor, enabling higher concentration of chlorine dioxide without risk for explosion and also improving the yield. However, contrary to conventional subatmospheric processes for chlorine dioxide production, it is preferred that no sulfate is crystallised. Suitably, the absolute pressure is maintained from about 60 to about 600 mm Hg, preferably from about 60 to about 400 mm Hg, most preferably from about 75 to about 350 mm Hg. However, it is preferred to operate the electrochemical cell at atmospheric pressure, since pressure fluctuations in the different chambers may damage the membranes.

According to a particular embodiment, the electrochemical cell is placed below the chlorine dioxide reactor. Gas generated in the cell, or added to the acidified reaction medium creates a gas lift sufficiently strong for circulating the reaction medium between the cell and the reactor.

The temperature in the electrochemical cell is suitable maintained at substantially the same temperature as in the chlorine dioxide reactor.

High acidity in the chlorine dioxide reactor favours the production rate. On the other hand, high acidity in the electrochemical cell causes the current efficiency to decrease. In order to achieve both effective chlorine dioxide production and high current efficiency, a preferred embodiment in a method of producing chlorine dioxide according to the invention comprises the steps of: recirculating reaction medium from the reactor in a first circulation loop, preferably comprising a heater; withdrawing a portion of the reaction medium from the first loop and transferring it to a second circulation loop comprising the electrochemical cell; and withdrawing a portion of the medium from the second loop and transferring it to the first loop. Since the medium is acidified in the electrochemical cell, while acid is consumed in the chlorine dioxide reactor, the acidity in the second loop is normally slightly higher than in the first loop. However, the difference in acidity in the two loops should preferably be as low as possible, suitably less than about 0.5N, preferably less than about 0.3N, most preferably less than about 0.1N. It is fully possible to operate the system with substantially the same acidity in the two loops at steady state.

Chlorine dioxide production according to the invention can be performed substantially without removing any chlorate or sulfate from the system. Substantially all chlorate supplied is transformed to chlorine dioxide, i.e. the main product. The alkali metal supplied can be withdrawn from the system as alkali metal hydroxide, a valuable by product. It is possible to operate without adding or withdrawing sulfate from the system, but circulating the sulfate as a dead load improving the efficiency of the electrochemical acidification of the reaction medium. By maintaining the current efficiency below maximum, the cell can be operated for a long time at high current density without problems with voltage increase and it is also possible achieve high chlorine dioxide production. Thus, it has been found possible to provide a method of producing chlorine dioxide from alkali metal chlorate without formation of by products other than valuable substances such as alkali metal hydroxide, hydrogen gas and oxygen gas. Further, in the embodiments operating without crystallisation of sulfate or chlorate, there is no need for a filter for removing any salt cake which saves a considerable amount of investment costs, and in is also easy to make the process work continuously at steady state. Another advantage in a chlorine dioxide production process of the invention, is that only a small amount of water has to be added to the system, thus decreasing the amount that has to be heated and withdrawn by evaporation. Normally, water is only added to the system as a solvent for the make up alkali metal chlorate and the reducing agent. Furthermore, each alkali metal ions passing the membrane in the electrochemical cell, brings a couple of water molecules, thus further decreasing the amount of water to be evaporated.

Figure 2:
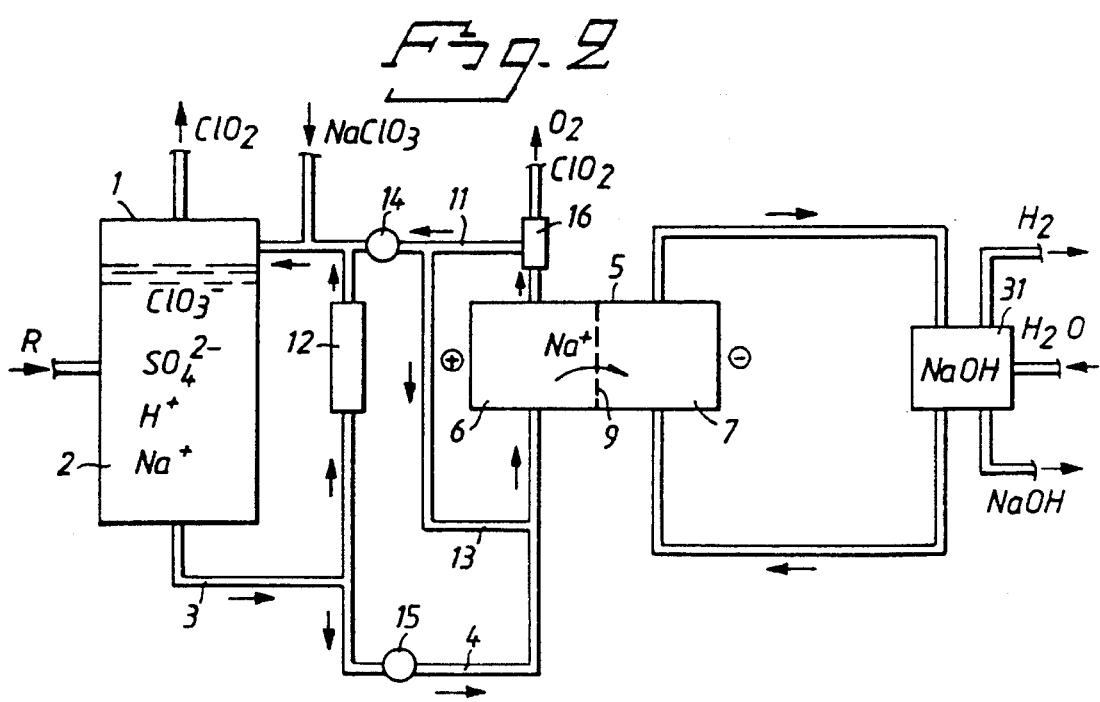
FIG. 2 is schematic of another embodiment of the invention using a two chamber electrochemical cell.
Figure 3:
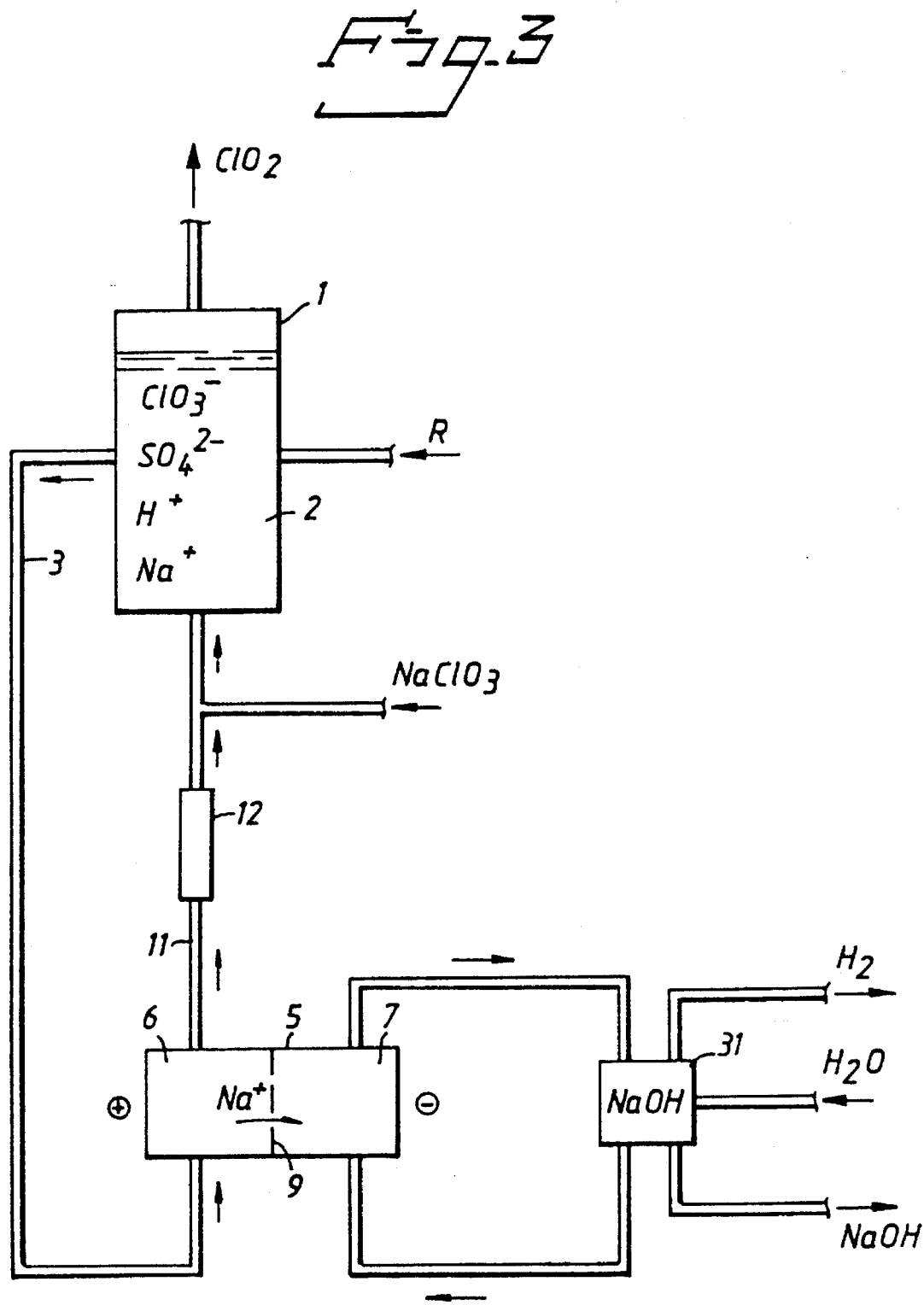
FIG. 3 is a schematic of a further embodiment of the invention using a two chamber electrochemical cell and in which substantially all of the reaction medium withdrawn from the reactor passes through an anode chamber of the cell.

The invention will now be described more in detail with reference to the drawings. The FIGS. 1, 2 and 3 schematically show three different embodiments of the invention. The invention is, however, not restricted to what is described below, and it is apparent to those skilled in the art that many other embodiments can be employed within the scope of the claims.

Referring to FIG. 1, a preferred system for producing chlorine dioxide comprises an SVP®-reactor 1 containing an aqueous reaction medium 2. In the reaction medium 2 chlorate ions, sulfate ions, hydrogen ions and sodium ions are present. A reducing agent R, preferably methanol or hydrogen peroxide, is supplied to the reaction medium while chlorine dioxide generated in the reaction medium 2 is withdrawn as a gas together with evaporated water diluting the chlorine dioxide to a safe concentration. The withdrawn gas is preferably transferred no a condenser (not shown) in which some of the water is condensed and then to an absorber (not shown) in which the chlorine dioxide is dissolved in water. In order to avoid reaching the explosion limit of chlorine dioxide, an inert gas is often added before the condenser.

In the reactor 1, the absolute pressure is preferably from about 75 to about 400 mm Hg and the temperature is preferably from about 50° to about 85° C. If methanol is used as the reducing agent R, the reaction medium 2 preferably contains chlorate in a concentration below about 90% of the saturation concentration, normally from about 2 to about 5 moles/liter. Further, it preferably contains from about 6 to about 7 moles/liter of sulfate, from about 10 to about 12 moles/liter of sodium, and has an acidity from about 6 to about 7N. If hydrogen peroxide is used as the reducing agent, the chlorate content of the reaction medium 2 is preferably below about 90% of the saturation concentration, normally from about 2 to about 5 moles/liter. Further, it preferably contains from about 4 to about 5 moles/liter of sulfate, from about 8 to about 10 moles/liter of sodium and has an acidity from about 4 to about 5N.

The reaction medium 2 is continuously circulating through line 3 and a heater 12. Part of the circulating reaction medium is withdrawn from line 3 to line 4 and transferred to the central compartment 8 of a three chamber cell 5 comprising two cation-exchange membranes 9, 10. In the cell 5, the anode compartment 6 is supplied with sulfuric acid from a tank 21 and the cathode compartment 7 is supplied with sodium hydroxide from a tank 31. In the anode compartment 6, hydrogen ions are generated and passed through the membrane 9 into the central compartment 8. Sodium ions from the reaction medium in the central compartment 8 are passed through the membrane 10 into the cathode compartment. The electrochemical reactions result in acidification of the reaction medium in the central compartment 8, generation of oxygen gas in the anode compartment, and generation of sodium hydroxide and hydrogen gas in the cathode compartment.

As the reaction medium 2 withdrawn from the reactor 1 in addition to chlorate also normally contains small amount of unreacted reducing agent, generation of chlorine dioxide will continue in the lines 3, 4 and in the middle compartment 8 of the cell 5. The acidified reaction medium is withdrawn from the middle compartment 8 of the cell 5 and preferably transferred to a gas separator 16 in which chlorine dioxide is withdrawn and preferably mixed with the chlorine dioxide withdrawn from the reactor 1. The mixing of the two chlorine dioxide streams can be performed at any suitable place, for example in the reactor 1, or before or after the condenser (not shown). At least some of the liquid phase from the gas separator 16 is mixed with the reaction medium from the heater 12 and with an aqueous solution of make up sodium chlorate, and then recycled back through line 11 to the reactor 1. A portion of the liquid phase is preferably recycled back to the cell 5 through line 3. Such a system thus comprises two circulation loops for the reaction medium, a first loop including the reactor 1, line 3 and the heater 12, a second loop including the cell 5, the gas separator 16 and line 13. The difference in acidity of the medium in the two loops should preferably be as low as possible. In the tank 21, oxygen is withdrawn and water is added to the anolyte. The electrochemical cell 5 is operated under atmospheric pressure and the connections between the cell 5 and the reactor 1 is therefore provided with means 14, 15 for altering the pressure of the reaction medium, for example, ordinary pumps. Alternatively, the chlorine dioxide reactor 1 can be placed at a higher level than the cell 5, the pressure thus being altered by the gravity force. In the tank 31, hydrogen and sodium hydroxide are withdrawn and water is added to the catholyte.

Referring to FIG. 2, another preferred embodiment for producing chlorine dioxide is shown. The system is similar to the one shown in FIG. 1, except that the electrochemical cell 5 only consist of two chambers 6, 7 divided by a cation-exchange membrane 9. The chlorine dioxide reactor 1 and the catholyte system 7, 31 are operated as in FIG. 1. The reaction medium to be acidified is transferred through line 4 to the anode compartment 6 of the cell 5, in which compartment 6 hydrogen ions and oxygen gas are generated. Sodium ions are passed through the cation-exchange membrane 9 into the cathode compartment 7 in which hydroxide ions and hydrogen gas are generated. As in the embodiment of FIG. 1 chlorine dioxide generation is normally continued in the lines 3, 4 and in the anode compartment 6 of the cell 5. The acidified reaction medium withdrawn from the anode compartment 6 is preferably transferred to a gas separator 16 in which oxygen and chlorine dioxide gas is withdrawn and mixed with the chlorine dioxide withdrawn from the reactor as in the embodiment of FIG. 1. Since also oxygen is present the need for addition of an inert gas to the chlorine dioxide is decreased. Further, if the chlorine dioxide is to be used for bleaching, also the oxygen acts as a bleaching agent. The portion of the liquid phase withdrawn from the gas separator 16 not recycled back to the cell 5 through line 13 is transferred to the chlorine dioxide reactor 1 in the same manner as in FIG. 1, implying that also the two circulation loops for the reaction medium work out as in the embodiment of FIG. 1. Accordingly, chlorine dioxide, sodium hydroxide, hydrogen gas and oxygen gas are produced as in the system described in FIG. 1.

Referring to the embodiment of FIG. 3, the chlorine dioxide reactor 1 and the cell 5 works as in FIG. 2. However, the cell 5 should be placed below the reactor 11. Preferably the heater 12 is placed between the cell 5 and the reactor 1. Substantially all the reaction medium withdrawn from the reactor 1 is passed through the anode compartment 6 of the cell 5. Since oxygen gas is generated, the gas lift will create a sufficiently strong pumping effect to circulate the reaction medium without any additional pumps. If only small amount of gas is generated in the cell 5, for example if a three chamber cell of FIG. 1 is used, inert gas such as air can be added after the cell in order to obtain the desired gas lift. The system is preferably designed with a difference in height between the reactor 1 and the cell 5 so to balance the subatmospheric pressure in the reactor 1 and the atmospheric pressure in the cell 5 with the gravity force.

The following Examples are intended to describe some specific ways of operating the process of the invention but should not be interpreted as limiting its scope.

EXAMPLE 1

A 3 liter chlorine dioxide reactor was connected to a three chamber MP-cell™ (Electrocell AB, Sweden), forming a system as described in FIG. 1 with a total volume of 5 liters. The system was charged with 5 liters of an aqueous solution consisting of 5.4 moles/liter $H^+$, 5.4 moles/liter $SO_4^{2-}$, 1.9 moles/liter $ClO_3^-$ and 7.3 moles/liter $Na^+$. The anolyte was maintained constant at 100 g/l sulfuric acid by addition of water, and the catholyte was maintained constant at 140 g/l sodium hydroxide by withdrawing sodium hydroxide and feeding water. The chlorine dioxide generator was operating a 60° C. and 150 mm Hg, and the cell was operating at the same temperature but at atmospheric pressure. Methanol was used as reducing agent and the system was fed with a 545 g/l sodium chlorate solution. The cell was operating at a current of 30 A, corresponding to a current density of 3 $kA/m^2$, and the system was operating at steady state conditions for 5 hours. The current efficiency for sodium hydroxide production was 67% and the gram atom efficiency for chlorine dioxide production was 100%.

EXAMPLE 2

A 3 liter chlorine dioxide reactor was connected to a three chamber MP-cell™ (Electrocell AB, Sweden), forming a system as described in FIG. 1 with a total volume of 5 liters. The system was charged with 5 liters of an aqueous solution consisting of 3.2 moles/liter $H^+$, 3.35 moles/liter $SO_4^{2-}$, 3.3 moles/liter $ClO_3^-$ and 6.8 moles/liter $Na^+$. The anolyte was maintained constant at 100 g/l sulfuric acid by addition of water, and the catholyte was maintained constant at 140 g/l sodium hydroxide by withdrawing sodium, hydroxide and feeding water. The chlorine dioxide generator was operating a 65° C. and 195 mm Hg, and the cell was operating at the same temperature but at atmospheric pressure. Hydrogen peroxide was used as reducing agent and the system was fed with a 530 g/l sodium chlorate solution. The cell was operating at a current of 30 A, corresponding to a current density of 3 $kA/m^2$, and the system was operating at steady state conditions for 8 hours. The current efficiency for sodium hydroxide production was 71% and the gram atom efficiency for chlorine dioxide production was 100%.

EXAMPLE 3

A 3 liter chlorine dioxide reactor was connected to a two chamber MP-cell™ (Electrocell AB, Sweden), forming a system as described in FIG. 2 with a total volume of 5 liters. The system was charged with 5 liters of an aqueous solution consisting of 6 moles/liter $H^+$, 6 moles/liter $SO_4^{2-}$, 2 moles/liter $ClO_3^-$ and 8 moles/liter $Na^+$. The catholyte was maintained constant at 140 g/l sodium hydroxide by withdrawing sodium hydroxide and feeding water. The chlorine dioxide generator was operating a 60° C. and 150 mm Hg, and the cell was operating at the same temperature but at atmospheric pressure. Methanol was used as reducing agent and the system was fed with a 545 g/l sodium chlorate solution. The cell was operating at a current of 30 A, corresponding to a current density of 3 $kA/m^2$, and the system was operating at steady state conditions for 8 hours. The current efficiency for sodium hydroxide production was 66% and the gram atom efficiency for chlorine dioxide production was 100%.

EXAMPLE 4

A 3 liter chlorine dioxide reactor was connected to a three chamber MP-cell™ (Electrocell AB, Sweden), forming a system as described in FIG. 2 with a total volume of 5 liters. The system was charged with 5 liters of an aqueous solution consisting of 4 moles/liter $H^+$, 4 moles/liter $SO_4^{2-}$, 2.2 moles/liter $ClO_3^-$ and 6.2 moles/liter $Na^+$. The catholyte was maintained constant at 140 g/l sodium hydroxide by withdrawing sodium hydroxide and feeding water. The chlorine dioxide generator was operating a 65° C. and 195 mm Hg, and the cell was operating at the same temperature but at atmospheric pressure. Hydrogen peroxide was used as reducing agent and the system was fed with a 530 g/l sodium chlorate solution. The cell was operating at a current of 30 A, corresponding to a current density of 3 $kA/m^2$, and the system was operating at steady state conditions for 8 hours. The current efficiency for sodium hydroxide production was 70% and the gram atom efficiency for chlorine dioxide production was 100%.

EXAMPLE 5

A 3 liter chlorine dioxide reactor was connected to a three chamber MP-cell™ (Electrocell AB, Sweden), forming a system as described in FIG. 1 with a total volume of 3.8 liters. The system was charged with 3.8 liters of an almost saturated aqueous solution consisting of 6.3 moles/liter $H^+$, 6.1 moles/liter $SO_4^{2-}$, 2.4 moles/liter $ClO_3^-$ and 8.3 moles/liter $Na^+$. The anolyte was maintained constant at 100 g/l sulfuric acid by addition of water, and the catholyte was maintained constant at 130 g/l sodium hydroxide by withdrawing sodium hydroxide and feeding water. The chlorine dioxide generator was operating a 64° C. and 150 mm Hg, and the cell was operating at the same temperature but at atmospheric pressure. Methanol was used as reducing agent and the system was fed with a 550 g/l sodium chlorate solution. Initially, the cell was operating at a current density of 3 $kA/m^2$ and a voltage of 10 V. It was expected that the current efficiency would be about 60%. However, during start up a temperature drop resulted in saturation of the aqueous solution and the cell voltage increased to 15 V. Although the temperature was corrected within 20 minutes, it was necessary to decrease the current density and operate at only 2 $kA/m^2$ for 12 hours until the voltage at reached the estimated 10 V, thus considerably lowering the capacity of the cell.

EXAMPLE 6

A 3 liter chlorine dioxide reactor was connected to a SYN-cell™ comprising three cell units, each unit containing three compartment separated by cation-exchange membranes and forming a system as described in FIG. 1 with a total volume of 4.25 liters. The system was charged with 4.25 liters of an aqueous solution consisting of 6.9 moles/liter $H^+$, 6.1 moles/liter $SO_4^{2-}$, 2.4 moles/liter $ClO_3^-$ and 7.7 moles/liter $Na^+$. The anolyte was maintained constant at 100 g/l sulfuric acid by addition of water, and the catholyte was maintained constant at 150 g/l sodium hydroxide by withdrawing sodium hydroxide and feeding water. The chlorine dioxide generator was operating at about 65° C. and 150 mm Hg, and the cell was operating at the same temperature but at atmospheric pressure. Methanol was used as reducing agent and the system was fed with a 59 g/l sodium chlorate solution. The cell was operating at a voltage of 4 V and a current density of 0.74 kA/m$^2$, and the system was operating at steady state conditions for 4 hours. The current efficiency for sodium hydroxide production was 62.2% and the production rate chlorine dioxide was 0.48 tonnes per m$^3$ and 24 hours.

EXAMPLE 7

The experiment of Example 6 was repeated except that the aqueous solution charged consisted of 7.1 moles/liter H$^+$, 6.3 moles/liter SO$_4^{2-}$, 2.6 moles/liter ClO$_3^-$ and 8.1 moles/liter Na$^+$ and that the current density was 1.55 kA/m$^2$. The system was operating at steady state conditions for 4 hours. The current efficiency for sodium hydroxide production was 59.6% and the production rate of chlorine dioxide was 0.87 tonnes per m$^3$ and 24 hours.

EXAMPLE 8

The experiment of Example 6 was repeated except that the aqueous solution charged consisted of 7.7 moles/liter H$^+$, 6.9 moles/liter SO$_4^{2-}$, 2.8 moles/liter ClO$_3^-$ and 8.9 moles/liter Na$^+$ and that the current density was 2.44 kA/m$^2$. The system was operating at steady state conditions for 3.5 hours. The current efficiency for sodium hydroxide production was 56.8% and the production rate of chlorine dioxide was 1.57 tonnes per m$^3$ and 24 hours.

EXAMPLE 9

The experiment of Example 6 was repeated except that the aqueous solution charged consisted of 4.1 moles/liter H$^+$, 3.7 moles/liter SO$_4^{2-}$, 2.7 moles/liter ClO$_3^-$ and 6 moles/liter Na$^+$, hydrogen peroxide was used as reducing agent and that the current density was 1.22 kA/m$^2$. The system was operating at steady state conditions for 3.5 hours. The current efficiency for sodium hydroxide production was 74.3% and the production rate of chlorine dioxide was 0.96 tonnes per m$^3$ and 24 hours.

EXAMPLE 10

The experiment of Example 9 was repeated except that the aqueous solution charged consisted of 4.1 moles/liter H$^+$, 3.6 moles/liter SO$_4^{2-}$, 2.7 moles/liter ClO$_3^-$ and 5.8 moles/liter Na$^+$ and that the current density was 1.72 kA/m$^2$. The system was operating at steady state conditions for 2.5 hours. The current efficiency for sodium hydroxide production was 71.6% and the production rate of chlorine dioxide was 1.38 tonnes per m$^3$ and 24 hours.

We claim:

1. A method of producing an acidified aqueous solution containing alkali metal sulfate and chlorate, comprising the steps of introducing an aqueous solution containing alkali metal sulfate and chlorate into an electrochemical cell and electrochemically increasing the acidity of said aqueous solution, wherein the current efficiency of the cell is maintained below 70% and above about 40% for the withdrawal of alkali metal ions from the solution to be acidified.

2. A method as claimed in claim 1, wherein the current efficiency is maintained above about 40%.

3. A method as claimed in claim 1, wherein the electrochemical cell used comprises an anode compartment and a cathode compartment divided by at least one ion selective membrane.

4. A method as claimed in claim 1, wherein the chlorate content is maintained from about 20% to about 90% of the saturation concentration.

5. A method as claimed in claim 1, wherein the solution acidified in the electrochemical cell contains more than about 3 moles/liter of sulfate.

6. A method as claimed in claim 1, wherein the solution acidified in the electrochemical cell contains more than about 4 moles/liter of sulfate.

7. A method as claimed in claim 1, wherein the molar ratio H$^+$:SO$_4^{2-}$ in the solution introduced into the electrochemical cell is from about 0.5 to about 1.5.

8. A method as claimed in claim 7, wherein the molar ratio H$^+$:SO$_4^{2-}$ in the solution introduced into the electrochemical cell is from 0.7 to 1.3.

9. A method of producing chlorine dioxide comprising the steps of providing a reactor with an aqueous acidic reaction medium containing alkali metal chlorate and sulfate; reducing chlorate ions in said reaction medium to form chlorine dioxide; withdrawing chlorine dioxide gas from the reaction medium; withdrawing reaction medium from the reactor and transferring it to an electrochemical cell substantially without crystallization of sulfate or chlorate; electrochemically acidifying said reaction medium to increase the acidity and to decrease the content of alkali metal ions; recycling acidified reaction medium to the reactor; adding make up alkali metal chlorate to the reaction medium before or after the electrochemical cell; wherein the current efficiency of the electrochemical cell is maintained below about 80% and above about 40% for the withdrawal of alkali metal ions from the solution to be acidified.

10. A method as claimed in claim 9, wherein the current efficiency is maintained below about 75%.

11. A method as claimed in claim 10, wherein the current efficiency is maintained below about 70%.

12. A method as claimed in claim 9, wherein the absolute pressure in the chlorine dioxide producing reactor is maintained from about 60 to about 400 mm Hg.

13. A method as claimed in claim 9 wherein the electrochemical cell is operated under atmospheric pressure.

14. A method as claimed in claim 9, wherein a reducing agent is added to the reaction medium.

15. A method as claimed in claim 14, wherein hydrogen peroxide is used as reducing agent.

16. A method as claimed in claim 14, wherein methanol is used as reducing agent and the current efficiency of the electrochemical cell is maintained below about 65%.

17. A method as claimed in claim 16, wherein the current efficiency of the electrochemical cell is maintained below about 60%.

18. A method as claimed in claim 9, wherein the method comprises the steps of: recirculating reaction medium from the reactor in a first circulation loop; withdrawing a portion of the reaction medium from the first loop and transferring it to a second circulation loop comprising the electrochemical cell; and withdrawing a portion of the medium from the second loop and transferring in to the first loop.

19. A method as claimed in claim 18, wherein the difference in acidity between the two loops is less than about 0.5N.

20. A method as claimed in claim 9, wherein the method is performed substantially without removing any chlorate or sulfate from the system.

21. A method of producing chlorine dioxide comprising the steps of providing a reactor with an aqueous acidic reaction medium containing alkali metal chlorate and sulfate; reducing chlorate ions in said reaction medium to form chlorine dioxide; withdrawing chlorine dioxide gas from the reaction medium; withdrawing reaction medium from the reactor and transferring it to an electrochemical cell; electrochemically acidifying said reaction medium to increase the acidity and to decrease the content of alkali metal ions; recycling acidified reaction medium to the reactor; adding make up alkali metal chlorate to the reaction medium before or after the electrochemical cell; wherein the current efficiency of the electrochemical cell is maintained below 70% and above about 40% for the withdrawal of alkali metal ions from the solution to be acidified.

22. A method of producing chlorine dioxide comprising the steps of providing a reactor with an aqueous acidic reaction medium containing alkali metal chlorate; reducing chlorate ions in said reaction medium to form chlorine dioxide using hydrogen peroxide as a reducing agent; withdrawing chlorine dioxide gas from the reaction medium; withdrawing reaction medium from the reactor and transferring it to an electrochemical cell; electrochemically acidifying said reaction medium to increase the acidity and to decrease the content of alkali metal ions; recycling acidified reaction medium to the reactor; adding make up alkali metal chlorate to the reaction medium before or after the electrochemical cell; wherein the current efficiency of the electrochemical cell is maintained below about 80% for the withdrawal of alkali metal ions from the solution to be acidified.

* * * * *